Dec. 12, 1967 J. P. JONES, JR 3,358,199

TAPE HANDLING SYSTEMS UTILIZING A MAGNETICALLY OPERATED SWITCH

Filed Aug. 11, 1964

INVENTOR
JOHN PAUL JONES, JR.

BY Watson, Cole, Grindle & Watson

ATTORNEYS 3,358,199

TAPE HANDLING SYSTEMS UTILIZING A MAGNETICALLY OPERATED SWITCH

John Paul Jones, Jr., Wynnewood, Pa., assignor to Navigation Computer Corporation, Norristown, Pa., a corporation of Pennsylvania Filed Aug. 11, 1964, Ser. No. 388,894

7 Claims. (Cl. 318—6)

ABSTRACT OF THE DISCLOSURE

A tape dispenser for a computer system meters out a measured tape loop for processing by means of a single magnetic switch operable to move with a pivotable arm. An A-C motor is triggered by the switch to dispense the tape over a range identified by the hysteresis range of the switch, and the motor is stopped as its current passes the zero axis.

This invention relates to tape handling systems used in digital recorders, and more particularly it relates to means for feeding tape loops incrementally to a digital transducer.

Digital tape recorders have conventionally included complex servo systems for incrementally winding and unwinding sections or loops of tape from high-inertia tape storage reels to permit low-inertia high speed character by character processing of code groupings on the tape from the unreeled sections of tape.

My copending application for tape transport system, Ser. No. 307,886, filed Sept. 10, 1963, provides for a simpler servo system which drives a motor momentarily and switches the motor drive voltage at zero-crossover wave points to prevent sparking and transient problems, which interfere with sensitive digital processing circuits. It is desirable to incorporate this feature in a servo tape feed system which is incorporated in the vicinity of low level (transistorized) electronic digital circuits, since otherwise motor drive transients will cause erratic circuit operation.

Also other significant problems are raised with simplified tape servo devices. One such problem is the different servo characteristics in the presence of different amounts of tape on a spool. Another problem is the provision of a consistent period for "momentarily" operating the tape feed motor from a switch responsive to a sensing arm position in the tape feed loop. Also a simple high speed motor reversal scheme for fast rewind is desired which is consistent with simplicity of design and retention of the favorable features of the tape feed servo design.

It is therefore an object of this invention to produce an exeecedingly simplified tape feeding system to incorporate the above mentioned features.

A specific object of the invention is to provide a simple tape servo system for consistently metering out a tape loop of the same length under various operating conditions.

Another object of the invention is to provide a simplified tape servo system with fast rewind capabilities.

Thus, there is provided by this invention a shaded pole motor with a tape reel mounted on its drive shaft for rotation therewith to release a section of tape loop each time a motor energizing circuit is closed temporarily. The motor energizing circuit is triggered by a magnet operated reed switch scanned by a magnet and closed at a predetermined position of a tape loop sensing arm which is pivoted about the motor shaft on a bearing sleeve. The trigger switch passes little current in actuating a pair of silicon controlled rectifiers (SCR), which both turn the motor off and on in a short energization cycle near the zero-current-crossover of the power source waveform. This results in a simplified and reliably operating tape feed system useful in digital tape transports utilizing magnetic or punch paper tape.

The foregoing objectives are realized and the invention is described along with further features and advantages with reference to the embodiment of the invention illustrated in the accompanying drawing, wherein.

Figure 1:
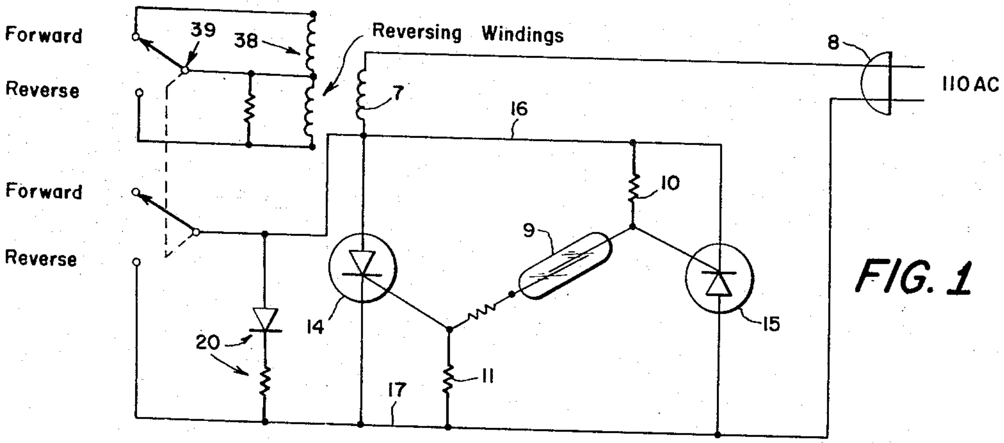
FIGURE 1 is a schematic circuit diagram of an embodiment of the tape feed motor drive circuit afforded by the invention.

The motor drive winding 7 may be connected to a source of A-C line potential at plug 8 through silicon controlled rectifiers (SCR) 14, 15, which are connected back to back between terminals 16 and 17 to operate as a triggered power source that does not require breaking any significant current flow through the glass reed switch 9. Thus, the life expectancy of operation of the servo mechanism is very high because the switch 9 is the only movable electronic part. Current limiting resistors 10 and 11 prevent significant line current flow through the switch, yet it is enough at the trigger electrodes of the silicon controlled rectifiers 14, 15 to fire them when the switch 9 is closed to form a voltage divider across the line voltage appearing at leads 16, 17. When switch 9 is open the trigger electrodes are at the level of respective leads 16, 17 so that the silicon controlled rectifiers 14, 15 are non-conductive and the motor is deenergized.

Figure 4:
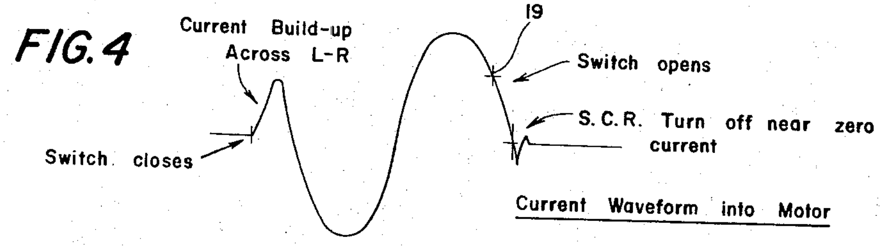
FIGURE 4 is a waveform diagram of the motor current pattern.

As may be seen from the current waveform of FIGURE 4, as the switch 9 closes, the appropriate SCR that will conduct on the portion of the positive half cycle illustrated will thus pass current flow through the motor winding resulting in an L-R buildup which limits the initial flow of current during that half cycle to the distorted current build up shown on the waveform, as the motor starts. The operation of each SCR to remain fired as long as its conductive half cycle is present is significant in avoiding transients at this time since "switch bounce" is not possible to introduce noise in the system. The remaining SCR then fires on the shown negative half cycle and the SCR's continue to alternately conduct to keep the full line current through motor winding 7 of FIGURE 1 until after the switch 9 is opened.

Whenever the switch 9 opens as shown at 19, the SCR will continue to conduct until its anode voltage goes very slightly negative. This results from the operational characteristics of silicon controlled rectifiers, which stay fired after being triggered as long as sustaining potential exists in the cathode-anode path. Accordingly at zero current negligible energy is stored in motor coil 7, so flyback transients, which are a main source of noise in electromagnetic systems, are avoided.

Figures 2, 3:
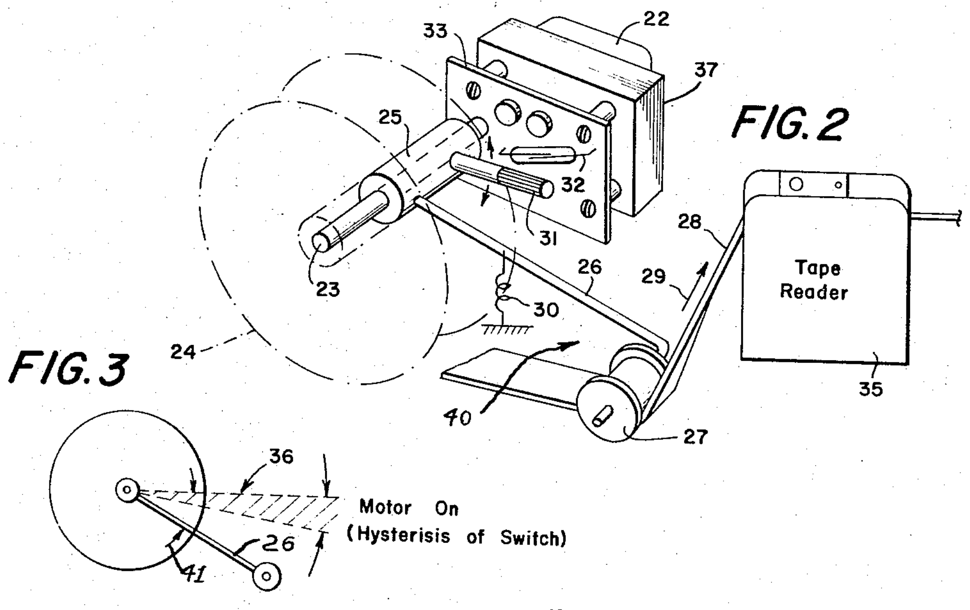
FIGURE 2 is a perspective view, partly in phantom, showing the tape feeding motor with its tape loop sensing control system.
FIGURE 3 is a sketch illustrating operation of the motor drive system afforded by the operation.

Each rectifier is thus triggered through its resistor 10, 11 as long as switch 9 is closed, and is cut off at optimum timing by the reversal of anode voltage when the switch 9 opens as is typified by the waveform in FIGURE 3. The two rectifiers 14, 15 together provide normal A-C drive current to the motor coil 7 when conducting, and in circuit avoid sparking on switch 9 and eliminate transients which may be introduced into closely positioned electronic circuits.

Operation of the servo tape feed controls is best seen from FIGURE 2. The motor 22, preferably of the shaded pole type to assure that it starts rotation in a single direction, has a drive shaft 23 upon which tape reel 24 is mounted for rotation therewith. A bearing sleeve 25 is mounted on the shaft to revolve thereon, and has an extending tape sensing pivot arm 26 with roller 27 engaging the tape 28 as it is pulled from reel 24 in the direction of arrow 29 for use in a digital transducer such as tape reader 35. Thus, upward movement of the tape 28 as it is pulled from the loop 35 will pivot arm 26 counter-clockwise against spring 30, causing sleeve 25 to rotate about shaft 23 until magnet 31 is positioned in a sector adjacent glass reed switch 32 mounted on circuit card 33, thereby closing its contacts and running motor 22 temporarily to release further tape into the loop 40 as a result of the counter-clockwise rotation of reel 23.

A D-C braking network 20 comprising a current limiting resistor and rectifier is inserted in series with motor winding 7 as seen in FIGURE 1. To appreciate the operation of this circuit, first consider the motor function as may be seen from FIGURE 2. Consider switch 32 to be closed only temporarily to give a brief current flow to motor 22. The motor rotates reel 24 to unwind tape into a loop controlled by tension arm 26. A certain amount of built in inertia to the system including weight of the tape on reel 24, the motor armature and the effect of gear train 37 upon the run-down of the motor will cause the motor to coast to a stop while it is unreeling tape 28 after being momentarily pulsed by closing of switch 32. However the tape loop fed out must be held within the full swing of the tension arm 26 to attain acceptable performance, and this must occur whether tape reel 24 is almost full or almost empty.

Accordingly when the switch 9 of FIGURE 1 opens and the SCR's 14, 15 are open circuited, then network 20 provides a pulsating D-C current to motor winding 7. This acts as a brake to limit the coasting of the motor, and is self-regulating since the braking action is proportional to the rate at which the motor armature is cutting lines of flux. Thus, if the spool 24 is almost full and the inertia tends to keep the armature rotating faster, the braking action is greater than when the armature is rotating more slowly. In this manner, the coast-down period is held at a constant length over a wide range of operating parameters, and the tape loop never exceeds the extent of travel of tape sensing arm 26.

An important feature relating to the "momentary" turn-on of the motor is the operation of the magnet 31 and the reed switch 32. As may be seen by reference to FIGURE 3, the motor should be on over a known sector 36 of the swing of the sensing arm 26. Should a switch contact be operated directly from sensing arm 26, it would be difficult to provide a known sector, since variable lengths of switch closure time coupled with bounce and hunting could result as the sensing arm 26 approached the switch at variable speeds and at different portions of the drive current waveform. This is resolved by use of the magnetic switch operation which uses a factor of operational hysteresis to give a fixed momentary period of motor energization to assure a constant sector 36 of motor operation, plus the additional coasting operation which returns the sensing arm to the lower limiting position of the sector 41. Thus, it takes more magnetic flux to close the contacts of switch 32, than to retain them closed. Accordingly as the contacts close at the upper limit of the region 36 and the motor serves to feed a tape loop letting the sensing arm 26 rotate clockwise, the contacts stay closed until the magnet moves away a distance represented by the lower limit of sector 36. The length of arc can be adjusted by proximity of the magnet and the amount of magnetic flux afforded by the strength of the magnet.

Fast rewind operation is incorporated in the system by means of the reversing windings 38 on the motor and the reversing switch 39. This switch 39 has two ganged sections respectively to connect full line potential to the winding 7 and to connect the appropriate reversing winding into circuit with the shaded pole motor. The gear train 37 can provide for high speed rotation of reel 24 without interfering with forward operation, because of the momentary nature of the forward motor drive period. Thus both a "low speed" intermittent feedout rate and a high speed continuous reverse rate for respooling is provided without changing gear ratios.

It is therefore evident from the foregoing description that several novel features have provided in combination an improved simple tape feed servo system affording meritorious and unexpected results. Those features of novelty believed representative of the invention and its nature are defined with particularity in the following claims.

I claim:

1. A tape feeding system for digital recorder tape comprising in combination, a drive motor having a winding and a shaft, a tape reel mounted on said shaft for rotation thereby, a bearing sleeve mounted to pivot about said shaft, a magnet carried by said sleeve for movement therewith, a magnetically operated switch positioned adjacent the path of said magnet, a pair of triggerable solid state rectifiers coupled to supply current to said motor winding of two polarities and having trigger electrodes coupled together by said switch, power means connected to said winding and said rectifiers to pass current therethrough when said switch is closed, whereby the motor runs to feed a loop of said tape when the magnet closes said switch, and means responsive to feeding of the tape loop to pivot said magnet away from said switch to thereby open said switch until the length of the tape loop is again decreased by pulling tape from said loop.

2. A motor control circuit comprising in combination, an A-C motor having a winding and a shaft, a sensing arm pivoted on said shaft having a magnet affixed thereto for movement throughout the range of movement of the pivoting of the sensing arm, tape feed means for coupling a loop of tape to move said pivot arm and said magnet responsive to energization of said motor, a triggered A-C power source coupled to energize said motor winding and hold the motor energized after triggering, and means responsive to A-C motor power which releases the triggered power source to deenergize the A-C motor only at an instant simultaneously as its A-C energizing current crosses the zero-axis, and a single position sensitive magnetic switch operated to open and close its contacts in response to the field about the magnet on said sensing arm and connected to trigger said power source when the magnet is positioned within an arc causing the switch to close its contacts thereby energizing the motor and serving to disconnect said power source after the sensing arm moves enough to remove the switch from the influence of the magnet and thereby open its contacts and deenergize the motor.

3. A motor control circuit comprising in combination, a motor having a winding and a shaft, a sensing arm pivoted on said shaft having a magnet movable therewith, tape feed means for coupling a loop of tape to move said pivot arm responsive to energization of said motor, a triggered power source coupled to energize said motor winding, and a position sensitive magnetic switch operated by the magnet on said sensing arm and connected to trigger said power source when the magnet is positioned to close its contacts thereby energizing the motor and disconnecting said power source after the sensing arm moves enough to remove the switch from the influence of the magnet and thereby opens its contacts and deenergizes the motor, including power line terminals, wherein the triggered device comprises a pair of silicon controlled rectifiers connected back to back between said winding and one of said terminals, a voltage divider connected in circuit with said terminals includes said switch and the switch coupled to the trigger electrodes of said rectifiers to trigger them into conduction through said motor winding when said switch is closed.

4. A motor control circuit comprising in combination, a motor having a winding and a shaft, a sensing arm pivoted on said shaft having a magnet movable therewith, tape feed means for coupling a loop of tape to move said pivot arm responsive to energization of said motor, a triggered power source coupled to energize said motor winding, and a position sensitive magnetic switch operated by the magnet on said sensing arm and connected to trigger said power source when the magnet is positioned to close its contacts thereby energizing the motor and disconnecting said power source after the sensing arm moves enough to remove the switch from the influence of the magnet and thereby opens its contacts and deenergizes the motor, wherein the motor has a reversing winding, and a switch circuit connects the motor for continuous reverse operation while shorting out said triggered power source.

5. In combination in a tape feeding system for advancing digital tape to a processing unit, a tape feed motor, a tape sensing arm for retaining a variable length of tape in a feed loop, a magnet on said sensing arm, a magnetic switch positioned to close a set of contacts in the vicinity of said magnet as it is moved into a predetermined position range by said arm, and a circuit connected to momentarily operate said motor when said switch contacts are closed, wherein the motor has a gear train and a drive shaft coupled thereto, a tape feed reel coupling on said drive shaft, reversing means in said motor, and a switching circuit for selectively coupling said reversing means for continuous rotation of said reel in one position and for momentary incremental rotation of said reel in the opposite direction in another position.

6. In combination in a tape feeding system for advancing digital tape to a processing unit, a tape feed motor, a tape sensing arm for retaining a variable length of tape in a feed loop, a magnet on said sensing arm, a magnetic switch positioned to close a set of contacts in the vicinity of said magnet as it is moved into a predetermined position range by said arm, and a circuit connected to momentarily operate said motor when said switch contacts are closed, wherein said circuit to momentarily operate said motor comprises an A-C power line, a series circuit including said motor and a pair of back to back silicon controlled rectifiers connected to said power line, and a circuit connecting said switch contacts to trigger said rectifiers only when said switch is closed, thereby causing said motor to become deenergized when the switch is opened at the zero current condition of the input A-C power.

7. The combination defined by claim 6 including a braking circuit coupled in parallel with said controlled rectifiers and comprising a rectifier diode to thereby pass D-C current through said motor when said controlled rectifiers are in their non-conductive state.

References Cited

UNITED STATES PATENTS

| | | | |
|---|---|---|---|
| 2,331,662 | 10/1943 | Delano | 242—45 |
| 3,060,357 | 10/1962 | Lohest | 318—6 |
| 3,117,262 | 1/1964 | Mullin | 318—7 |
| 3,249,713 | 5/1966 | Briggs | 335—208 |

ORIS L. RADER, *Primary Examiner.*

B. A. COOPER, *Assistant Examiner.*